June 19, 1923.
J. A. X. BURGOS
CUSHION TIRE
Original Filed July 12, 1922   2 Sheets-Sheet 1
1,458,926
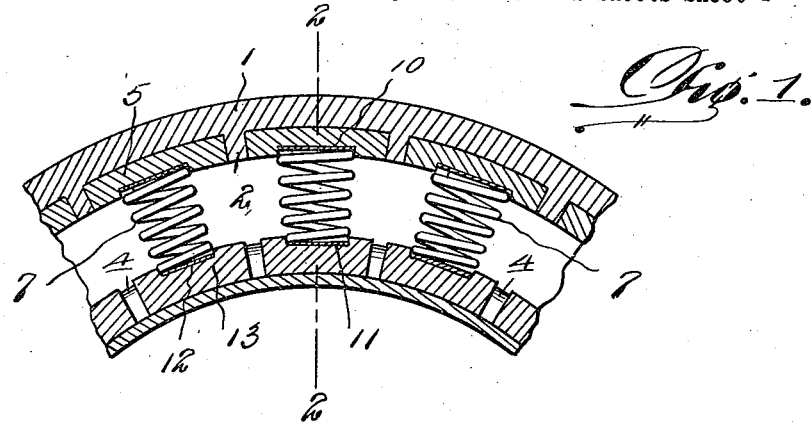
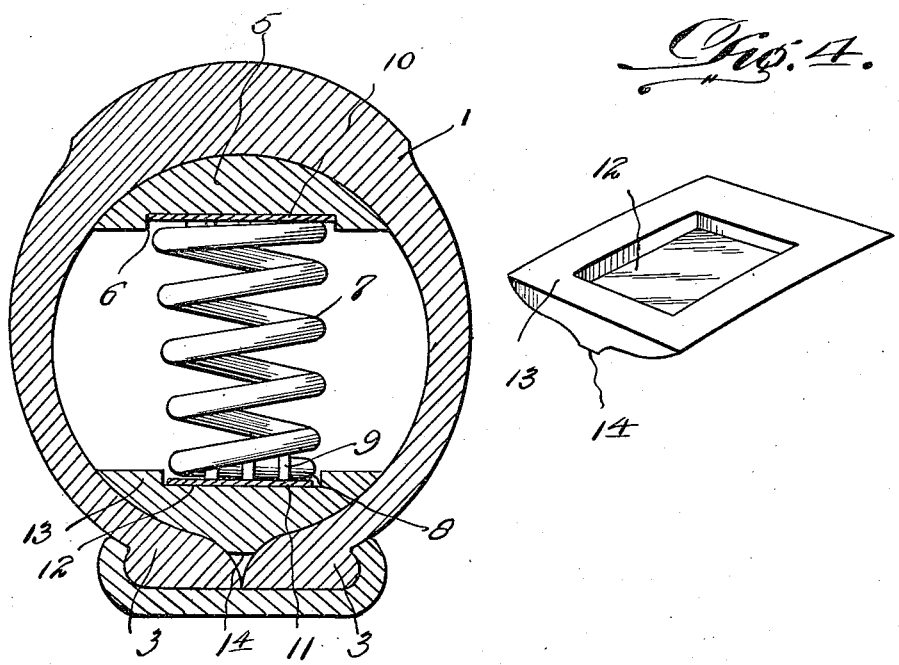
Witnesses:
Inventor
J. A. X. Burgos
Attorney June 19, 1923.  J. A. X. BURGOS  1,458,926
CUSHION TIRE
Original Filed July 12, 1922   2 Sheets-Sheet 2
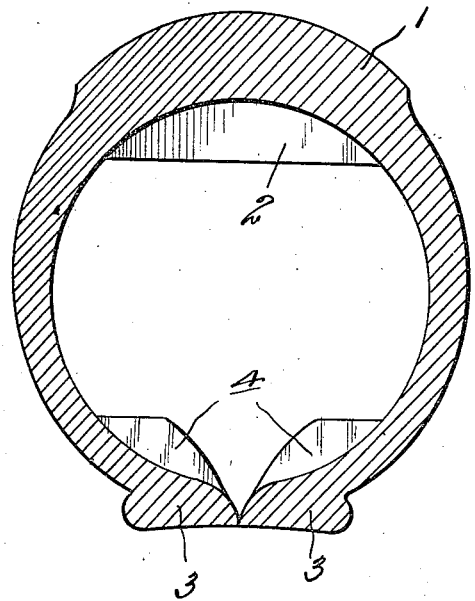
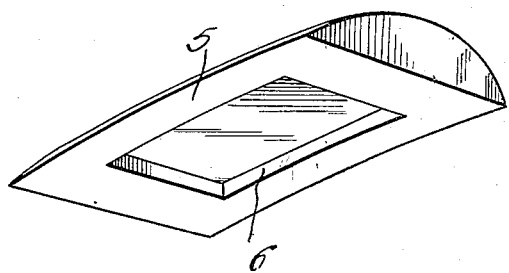
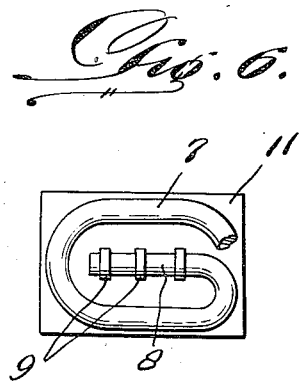

Patented June 19, 1923.

1,458,926

UNITED STATES PATENT OFFICE.

JUAN ANTONIO XEREZ BURGOS, OF MANILA, PHILIPPINE ISLANDS.

CUSHION TIRE.

Application filed July 12, 1922, Serial No. 574,505. Renewed March 7, 1923.

*To all whom it may concern:*

Be it known that I, JUAN ANTONIO X. BURGOS, a citizen of the Philippine Islands, residing at Manila, Philippine Islands, have invented new and useful Improvements in Cushion Tires, of which the following is a specification.

The object of my said invention is the provision of a cushion tire which is at once simple and inexpensive in construction and highly efficient in cushioning a wheel, and is characterized by resilient elements that are strongly maintained in spaced relation and yet are adapted to be expeditiously and easily removed separately from the casing or shoe and as readily replaced by fresh resilient elements.

To the attainment of the foregoing, the invention consists in the improvement as hereinafter described and definitely claimed.

In the accompanying drawings, forming part of this specification:—

Figure 1 is a longitudinal vertical section of so much of a cushion tire as is necessary to illustrate the preferred embodiment of my invention.

Figure 2 is an enlarged transverse section on the line 2—2 of Figure 1.

Figure 3 is an enlarged transverse section of the casing or shoe per se.

Figure 4 is a perspective of one of the inner spring seats and spacers.

Figure 5 is a perspective of one of the outer spring seats and spacers.

Figure 6 is a detail view illustrating the manner in which the end portions of the springs which constitute the resilient elements are connected to the wear plates at the opposite ends of the springs.

Similar numerals of reference designate corresponding parts in all of the views of the drawings.

As will be readily understood by comparison of Figures 1 and 3 the casing or shoe 1 of my novel tire is provided at the inner side of its outer portion with transverse flanges 2 spaced apart. The said shoe 1 is formed of the same material as an ordinary shoe or casing, and the said transverse flanges 2 are preferably integral with the shoe or casing. Said shoe or casing 1 is also provided at the inner sides of its portions 3 with transverse flanges 4, it being understood in this connection that the pairs of flanges 4 are spaced apart, and that each pair of flanges 4 is arranged in radial alinement with one of the before mentioned flanges 2.

Removably arranged between the flanges 2 are seats and spacers 5, Figures 1, 2 and 5, each of the said seats and spacers 5 being preferably shaped as shown and being provided in its inner side with a recess 6.

The resilient elements alluded to are in the form of convolute springs 7, and the said springs 7 are preferably, though not necessarily, of the general oblong form in cross-section shown in Figure 6. At their ends the springs 7 are provided with terminal portions 8, mounted to turn about their axes in journals 9 carried by outer wear plates 10 and inner wear plates 11. The outer wear plates 10 are arranged in the recess 6 of the seats and spacers 5, and the inner wear plates 11 are arranged in recesses 12 in inner seats and spacers 13. At this point I would have it understood that for the sake of lightness I prefer to form the seats and spacers 5 and 13, and in the preferred embodiment of my invention, the said plates 10 and 11 are also formed of aluminum. The inner seats and spacers 13 are removably arranged between the pairs of flanges 4, and each is provided with a longitudinal rib 14, designed to snugly rest as shown in Figure 2 between the casing portions 3.

Manifestly in virtue of the construction shown in Figures 1 and 2 my novel tire is adapted to efficiently cushion a vehicle even when a heavy load is imposed on the latter, and it will be noted that when the springs or resilient elements 7 are worn or broken they may be readily removed from the casing and as readily replaced with fresh springs or resilient elements 7. It will also be noted that the seats and spacers afford broad bearings for the ends of the springs against the outer portion and the inner portions of the casing so that the functioning of the springs does not entail undue wear of the said casing portions.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters-Patent is:—

A cushion tire comprising a casing with transverse spaced flanges at the inner side of its outer portion and with spaced pairs of flanges at the inner sides of its inner portions, outer and inner seats and spacers removably arranged between said flanges and within the casing and having recesses in their opposed sides, wear plates removably arranged in said recesses, and convolute springs interposed between said wear plates and having terminal portions journaled on and connected to the wear plates.

In testimony whereof, I affix my signature.

JUAN ANTONIO XEREZ BURGOS.